US012658162B2

(12) United States Patent
Wang et al.

(10) Patent No.: US 12,658,162 B2
(45) Date of Patent: Jun. 16, 2026

(54) DEVICE HAVING A CAMERA OVERLAID BY DISPLAY

(71) Applicant: LENOVO (SINGAPORE) PTE. LTD, New Tech Park (SG)

(72) Inventors: Mengnan Wang, Chapel Hill, NC (US); John W. Nicholson, Cary, NC (US); Howard Locker, Cary, NC (US); Daryl C. Cromer, Raleigh, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 0 days.

(21) Appl. No.: 17/651,479

(22) Filed: Feb. 17, 2022

(65) Prior Publication Data

US 2023/0260481 A1    Aug. 17, 2023

(51) Int. Cl.
| | |
|---|---|
| *G09G 5/10* | (2006.01) |
| *G06F 21/12* | (2013.01) |
| *G06F 21/83* | (2013.01) |
| *G06V 40/16* | (2022.01) |
| *G09G 3/3225* | (2016.01) |
| *G09G 5/02* | (2006.01) |

(52) U.S. Cl.
CPC ............. *G09G 5/10* (2013.01); *G06F 21/121* (2013.01); *G06F 21/83* (2013.01); *G06V 40/165* (2022.01); *G06V 40/171* (2022.01); *G09G 3/3225* (2013.01); *G09G 5/02* (2013.01)

(58) Field of Classification Search
CPC ........ G06F 3/013; G06F 3/0304; G06F 3/012; H04N 5/332; H04N 5/23229; H04N 5/2257; H04N 5/23293
See application file for complete search history.

(56) References Cited

U.S. PATENT DOCUMENTS

| | | | | |
|---|---|---|---|---|
| 2008/0298571 A1* | 12/2008 | Kurtz | ..................... | G06F 3/017 |
| | | | | 348/E7.083 |
| 2010/0149073 A1* | 6/2010 | Chaum | .............. | G02B 27/0075 |
| | | | | 345/8 |
| 2012/0293643 A1* | 11/2012 | Hanna | .................... | G06V 40/19 |
| | | | | 348/78 |
| 2015/0004382 A1* | 1/2015 | Menon | .............. | G02F 1/133509 |
| | | | | 156/60 |
| 2018/0276468 A1* | 9/2018 | Lee | ........................ | G06V 40/63 |
| 2019/0303724 A1* | 10/2019 | Linden | ................. | G06V 40/193 |
| 2019/0370448 A1* | 12/2019 | Devine | ................... | G06F 21/32 |
| 2020/0212368 A1* | 7/2020 | Tang | ....................... | H10K 50/86 |
| 2020/0363902 A1* | 11/2020 | Choi | ....................... | G06F 21/32 |
| 2021/0176383 A1* | 6/2021 | Kim | ...................... | G06F 3/0304 |

(Continued)

*Primary Examiner* — Shaheda A Abdin

(74) *Attorney, Agent, or Firm* — Carroll, Hoette & Butscher, LLC; Josef L. Hoffmann

(57) ABSTRACT

An electronic device is provided that includes a display stack having display pixels and at least one camera sensor located proximate to the display stack. The electronic device also includes a processor, and a memory storing program instructions accessible by the processor. Responsive to execution of the program instructions, the processor is configured to determine an identification of a user of the electronic device. The processor is also configured to determine selected display pixels of the display pixels based on a location of the display stack of the electronic device to the user, and actuate the selected display pixels to obstruct a field of view of the at least one camera sensor.

17 Claims, 5 Drawing Sheets

(56) References Cited

U.S. PATENT DOCUMENTS

| | | | |
|---|---|---|---|
| 2021/0360154 A1* | 11/2021 | Slobodin | H04N 23/90 |
| 2022/0116546 A1* | 4/2022 | Gummadi | G06T 13/80 |
| 2023/0238416 A1* | 7/2023 | Noudo | H10F 39/803 |
| | | | 257/291 |

* cited by examiner

DEVICE HAVING A CAMERA OVERLAID BY DISPLAY

FIELD

The present disclosure relates generally to implementing a camera behind a display of a device.

BACKGROUND OF THE INVENTION

Common smartphones, tablets, laptop computers, and other mobile electronic devices include both a display surface and a front-facing camera on the front side of the device. Display technologies employed in these mobile electronic devices include liquid-crystal display (LCD) or active-matrix organic light-emitting diode (AMOLED). A front-facing camera of a mobile electronic device may be used for taking self-portraits and for video calls, as well as other applications. Front-facing cameras continue to increase in resolution to increase the quality of images and videos captured thereby. One example of such a system is a camera-under-display (CUD) system where camera sensors are placed under the display screen.

Often electronic devices will have multiple users. In an attempt to enhance marketing to a user of the electronic device, programs, applications, or the like utilize the CUD to obtain image data related to the user for use with a biometric algorithm. The biometric algorithm utilizes software, including facial recognition software to determine who is using the electronic device so that certain advertisements may be pushed or provided to the specific user.

Problematically, users of the electronic device simply do not like the idea of being monitored by the electronic device for any reason. In particular, the user has no desire for marketers, or anyone else obtaining information related to them without their permission through the CUD. As a result, users will either physically cover the camera, or disable the camera feature altogether. This leads not only to annoyance, but also the camera not being utilized appropriately for its intended use.

SUMMARY

In accordance with embodiments herein, an electronic device is provided that includes a display stack having display pixels and at least one camera sensor located proximate to the display stack. The electronic device also includes a processor, and a memory storing program instructions accessible by the processor. Responsive to execution of the program instructions, the processor is configured to determine an identification of a user of the electronic device. The processor is also configured to determine selected display pixels of the display pixels based on a location of the display stack of the electronic device to the user, and actuate the selected display pixels to obstruct a field of view of the at least one camera sensor.

Optionally, the processor is configured to vary characteristics of the selected display pixels. In one aspect the characteristics of the selected display pixels include color and light intensity. In another aspect, the processor is configured to vary the selected display pixels. In one example, to vary the selected display pixels includes continuously determining a position of the display stack in relation to a face of a user. In another example, the processor is configured to prompt the user for user data and provide settings based on the user data.

Optionally, the processor is configured to determine a launching of an application on the electronic device, determine whether the application allows use of the at least one camera sensor, and stop actuating the selected display pixels in response to determining the application allows use of the at least on camera. In one aspect, the application is a web conferencing application. In another aspect, the processor is configured to determine the application has ended, and actuate the selected display pixels to obstruct a field of view of the at least one camera sensor in response to determining the application has ended. In one example, to determine the selected display pixels includes determining a location of at least one of an eye, nose, or mouth of a user and selecting the selected display pixels based on the location of the at least one of the eye, nose, or mouth of the user.

In accordance with embodiments herein, a method is provided where under control of one or more processors including program instructions to determine an identification of a user of the electronic device. The program instructions also determine selected display pixels of a display stack based on a location of the display stack of the electronic device to the user, and actuate the selected display pixels to obstruct a field of view of the at least one camera sensor.

Optionally, the program instructions vary characteristics of the selected display pixels. In one aspect, the program instructions vary the selected display pixels. In another aspect, to vary the selected display pixels includes continuously determining a position of the display stack in relation to a face of a user. In one example, the program instructions prompt the user for user data and provide settings based on the user data. In another example, the program instructions determine a launching of an application on the electronic device, determine whether the application allows use of the at least one camera sensor, and stop actuating the selected display pixels in response to determining the application allows use of the at least on camera. In yet another example, the program instructions determine the application has ended, and actuate the selected display pixels to obstruct a field of view of the at least one camera sensor in response to determining the application has ended. In one embodiment, to determine the selected display pixels includes determining a location of at least one of an eye, nose, or mouth of a user and selecting the selected display pixels based on the location of the at least one of the eye, nose, or mouth of the user.

In accordance with embodiments herein, an electronic device is provided that includes a display stack having display pixels, and at least one camera sensor located proximate to the display stack. The electronic device also includes a processor, and a memory storing program instructions accessible by the processor. Responsive to execution of the program instructions, the processor is configured to determine an identification of a user of the electronic device, and determine selected display pixels of the display pixels based on a location of the display stack of the electronic device to the user. The processor may also vary the selected display pixels based on a position of the display stack to a face of the user, and actuate the selected display pixels to obstruct a field of view of the at least one camera sensor. The processor may also determine a launching of an application on the electronic device, determine whether the application allows use of the at least one camera sensor, and stop actuating the selected display pixels in response to determining the application allows use of the at least on camera. Optionally, the processor is also configured to vary characteristics of the selected display pixels, and the characteristics of the selected display pixels include color and light intensity.

DETAILED DESCRIPTION

Figure 1:
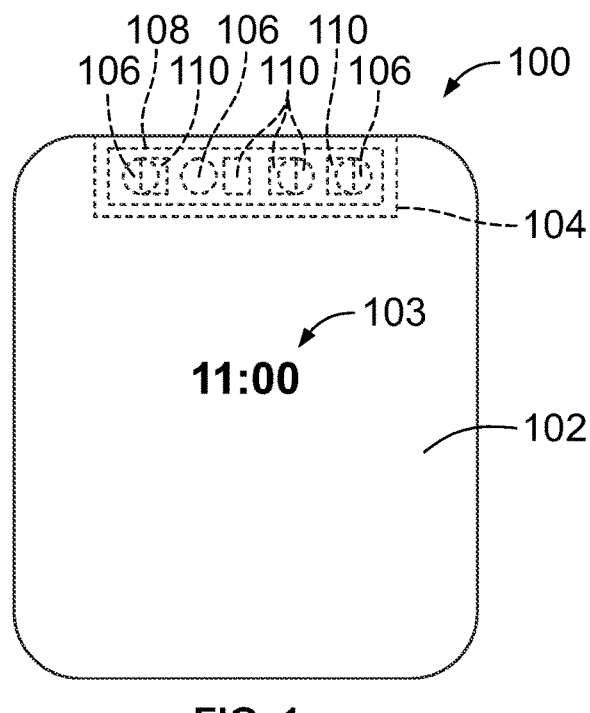
FIG. 1 illustrates a simplified block diagram of an electronic device in accordance with an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Provided is a system and method for providing security for the user of an electronic device that includes a CUD. A processor determines which display pixels of a display stack proximate to camera sensors are in the field of view of the camera sensors used to identify facial features such as an eye, nose, mouth, etc. of the user. By actuating these selected display pixels and varying characteristics of the selected display pixels, including the intensity, color, etc. of such selected display pixels, certain regions of an image captured by one or more camera sensors are blurred, obstructed, or the like. As the display stack moves relative to the face of the user, the selected display pixels may vary to ensure that display pixels in the field of view of the facial features of the user are actuated to obstruct the field of view.

The term "display pixel(s)" shall mean any area of illumination on a display screen that combines to form an image on the display screen. The area of illumination is an image element. The image formed may be a solid color, strip, item, person, numbers, letters, background, boarder, etc. A selected display pixel is a display pixel determined by a process to be in the field of view of camera sensor that detects regions of a face of a user. The regions can include areas of the face of the user utilized to detect the identify of the user and can include the eyes, nose, mouth, etc. of the user.

The term "camera display pixel(s)" shall mean any and all display pixels that are proximate to camera sensors. In this manner, the camera display pixels either block, partially block, or define openings that allow the passage of light so that the camera sensors can obtain image data. Specifically, the camera display pixels include display pixels that can affect the degree of light capture of the camera sensors. The camera display pixels are only in the proximate area of the camera sensors. As such the camera display pixels only form a portion of the display screen.

The term "camera sensor(s)" shall mean an area or element that obtains image data. The camera sensor may be on a substrate and obtain image data by receiving light reflected of the item being imaged. This includes partially receiving the image data as a result of camera display pixels partially blocking light from being received by the camera sensors.

The term "image data" shall mean data associated with one or more of two-dimensional (2-D) images, three-dimensional (3-D) images, panoramic images, still images, and/or video images.

The terms "processor," "a processor", "one or more processors" and "the processor" shall mean one or more processors. The one or more processors may be implemented by one, or by a combination of more than one electronic device, a wearable device, a local device, a remote device, a server computing device, a network of server computing devices and the like. The one or more processors may be implemented at a common location or at distributed locations. The one or more processors may implement the various operations described herein in a serial or parallel manner, in a shared-resource configuration and the like.

FIG. 1 illustrates an electronic device 100 that may be implemented in connection with devices having camera sensors positioned behind the display surface or display stack of the electronic device. For example, electronic devices having bezel-less and/or notch-less display surfaces may include front-facing cameras and/or camera sensors placed behind a display stack of an electronic device. Embodiments herein prevent programs and applications from obtaining image data capable of being utilized for a biometric algorithms. The electronic device 100 may be stationary or portable/handheld.

The electronic device 100 includes a display screen 102 that displays an image 103 thereon. The image may include colors, patterns, pictures, letters, numbers, symbols, etc. As will be described in further detail herein, the display screen 102 in one example is a display stack that includes numerous display pixels that each individually provide a different display light output, such as color, brightness, or the like. The display pixels in combination provide a display light output that is provided to form the image on the display 102.

The display 102 includes a CUD region 104. At the CUD region 104 plural camera sensors 106 are provided underneath the display 102 on a substrate 108. In this manner, the CUD region 104 depends on the location of the plural camera sensors. Thus, in an embodiment when camera sensors 106 are placed continuously under the entire display 102, the entire display could be considered a CUD region. The camera sensors 106 are configured to obtain and capture image data through openings defined by the display pixels 110. To this end, the display pixels proximate to the camera sensors 106 in the CUD region 104 are camera display pixels. In one example, the camera display pixels can have a density that is less than a density of non-camera display pixels to define more openings and open space for the camera sensors to obtain the image data.

In an example embodiment, one or more processors may actuate (e.g. turn on) selected display pixels within the CUD region 104 to prevent biometric algorithms from extracting facial features of a user. In one example, the selected display pixels may be actuated based on timing. In another example, the selected display pixels in one example may be actuated during a camera exposure, but not the entire exposure. The selected display pixels may be selected based on their location in relation to the face of the user, including pixels were the eyes, nose, mouth, etc. of the user are detected. In this manner, the image data obtained by the program, application, etc. is insufficient for a biometric algorithm to recognize and identify the user. As an example, certain face detection algorithms segment the face from the image background. Then, the facial region is aligned to help facial feature extraction. Features such as eyes, nose and mouth are pinpointed and measured in the image to represent the face. The established feature vector of the face can then be matched against a database of faces. However, as a result of the selected display pixels being actuated, these facial features are essentially blurred and not recognizable. Consequently, during the matching process, a match is unable to be made, preventing information related to the user from being obtained by the program, application, etc.

Figure 2A:
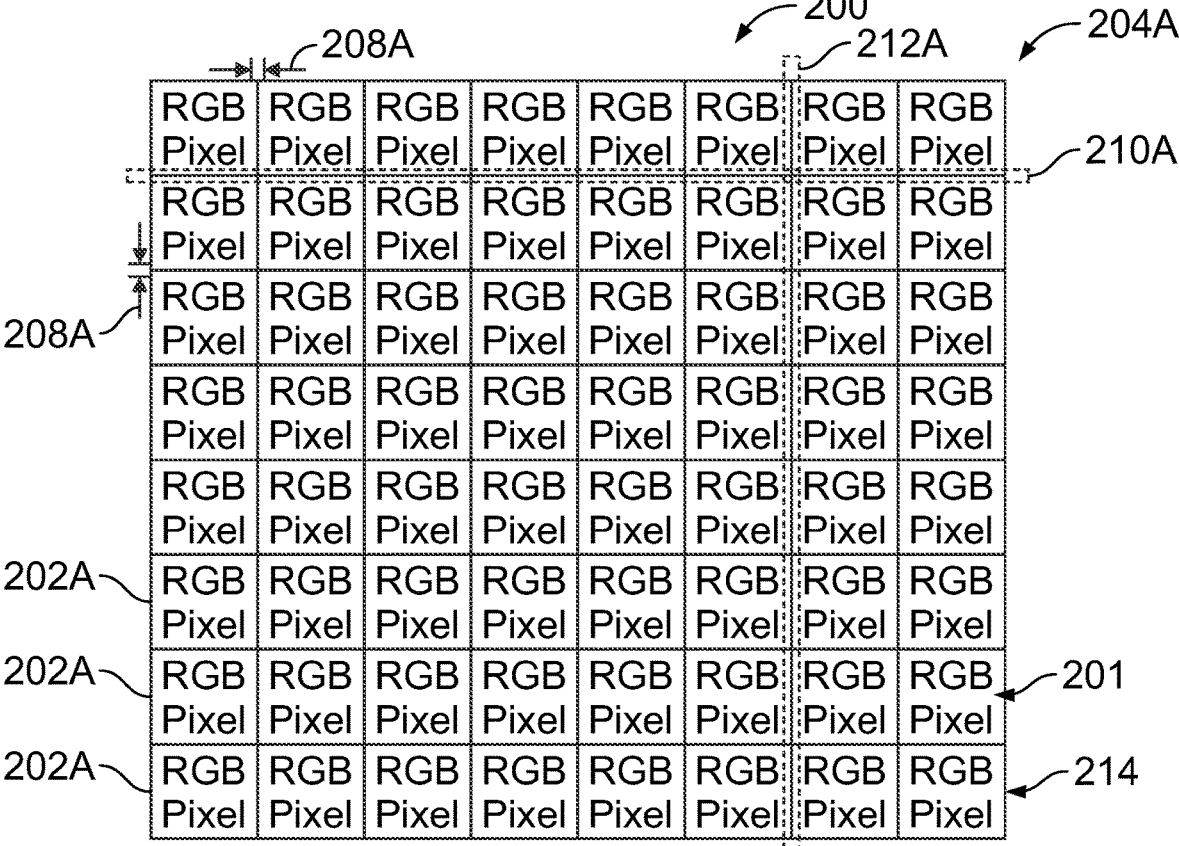
FIG. 2A illustrates one exemplary display stack in accordance with embodiments herein.

As illustrated in FIG. 2A, the display 102 in one example, is provided as a display stack 200 that includes an upper layer 201 with display pixels 202A arranged into a display matrix 204A. The display matrix 204A in one embodiment is a first resolution. The display pixels 202A are separated by openings 208A defined by the display pixels 202A. In one example, the display pixels are separated by openings 208A arranged into rows 210A and columns 212A. A bottom cathode layer 214 is provided as the final layer of the display stack 200, and operates to power the display pixels 202A.

Figure 2B:
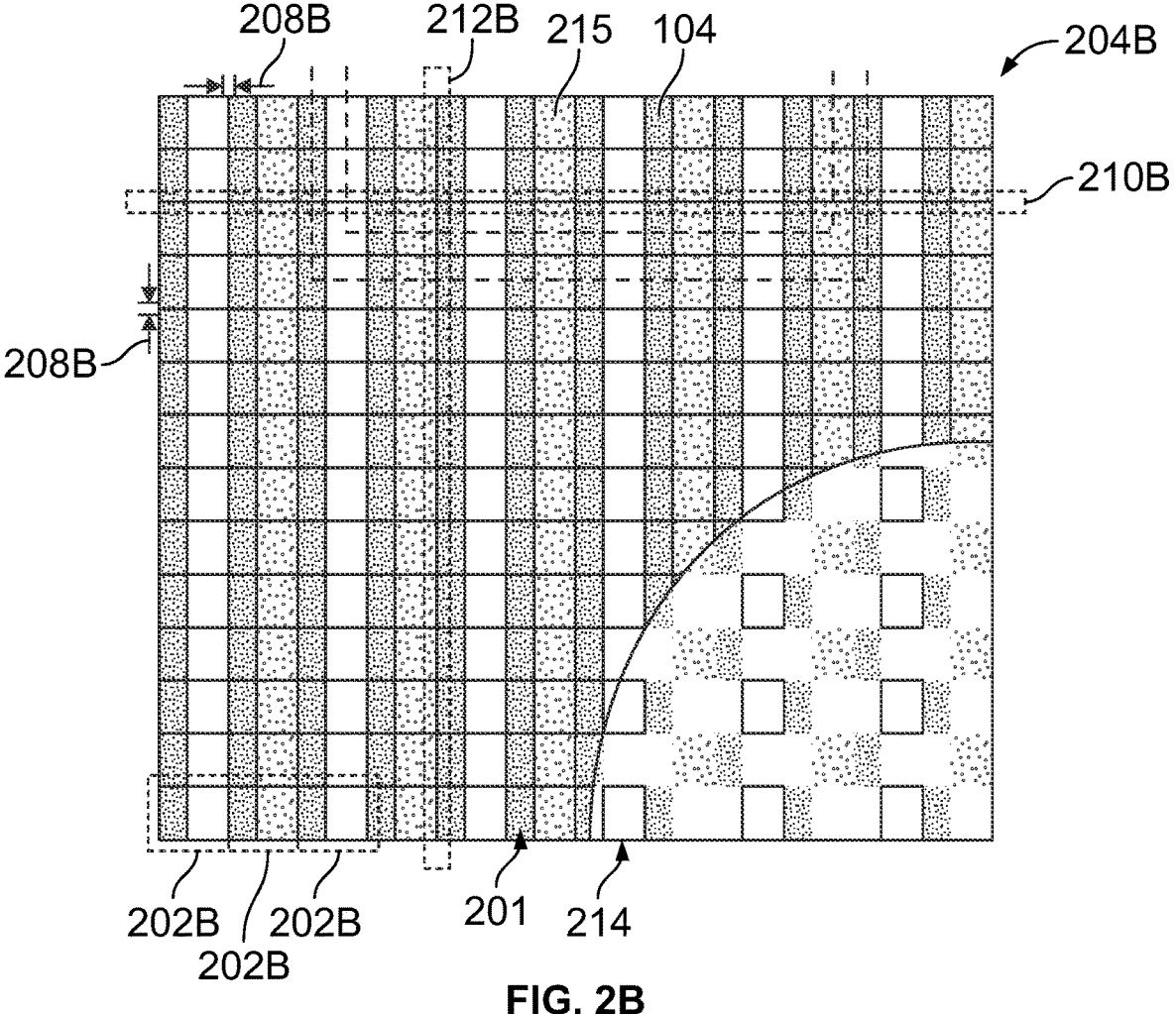
FIG. 2B illustrates another exemplary display stack in accordance with embodiments herein.

Additionally or alternatively, as illustrated in FIG. 2B, the display stack 200 includes display subpixel color elements 202B in the upper layer 201 arranged in a display matrix 204B. The display matrix 204B, in one example, has a first resolution. The display subpixel color elements 202B are separated by openings 208B. In one example, the display subpixel color elements are separated by openings 208B arranged into rows 210B and columns 212B. Each display subpixel color element 202B may include red, green, blue, yellow, white, or a like color primary. A plurality of subpixel color elements 202B cooperate to form a pixel, such as one of display pixels 202A in FIG. 2A. In an example, display matrix 204B may be the subpixel color element equivalent of display matrix 204A.

For the sake of clarity, unless context clearly dictates otherwise, pixels 202 refers to both display pixels 202A and display subpixel color elements 202B, display matrix 204 refers to both display matrix 204A and display matrix 204B, openings 208 refers to both openings 208A and openings 208B, rows 210 refers to both rows 210A and rows 210B, and columns 212 refers to both columns 212A and columns 212B.

At least a portion of the display stack 200 overlays the CUD region 104 such that a first subset of camera sensor pixels of the sensor matrix align with, and are covered by, camera display pixels 215 and a second subset of the camera sensor pixels of the sensor matrix align with, and are exposed through, the opening 208 defined by the camera display pixels 215. In particular, the camera display pixels 215 have a density that is less than a density of non-camera display pixels to allow more space for camera sensors and camera sensor pixels to obtain image data. In an example, the openings 208 may include at least a first row that overlays and exposes at least two rows of the camera sensor pixels and may include a first column that overlays and exposes at least two columns of the camera sensor pixels. Optionally, a third subset of the camera sensor pixels of the sensor matrix may be partially covered by the camera display pixels 215 and partially exposed through the openings 208 between the camera display pixels 215. Each of the first, second, and third subset of camera sensor pixels have varying degrees of light capture depending upon the amount each camera sensor pixel is covered, or not covered by corresponding proximate camera display pixels 215.

In one example, when the camera display pixels 215 define openings 208 arranged into rows 210 and columns 212, and image data represents the vertical and horizontal strips of the scene corresponding to the rows 210 and columns 212. Rows 210 and/or columns 212 opposite an opening 208 represent the first and second data segments.

Figure 3:
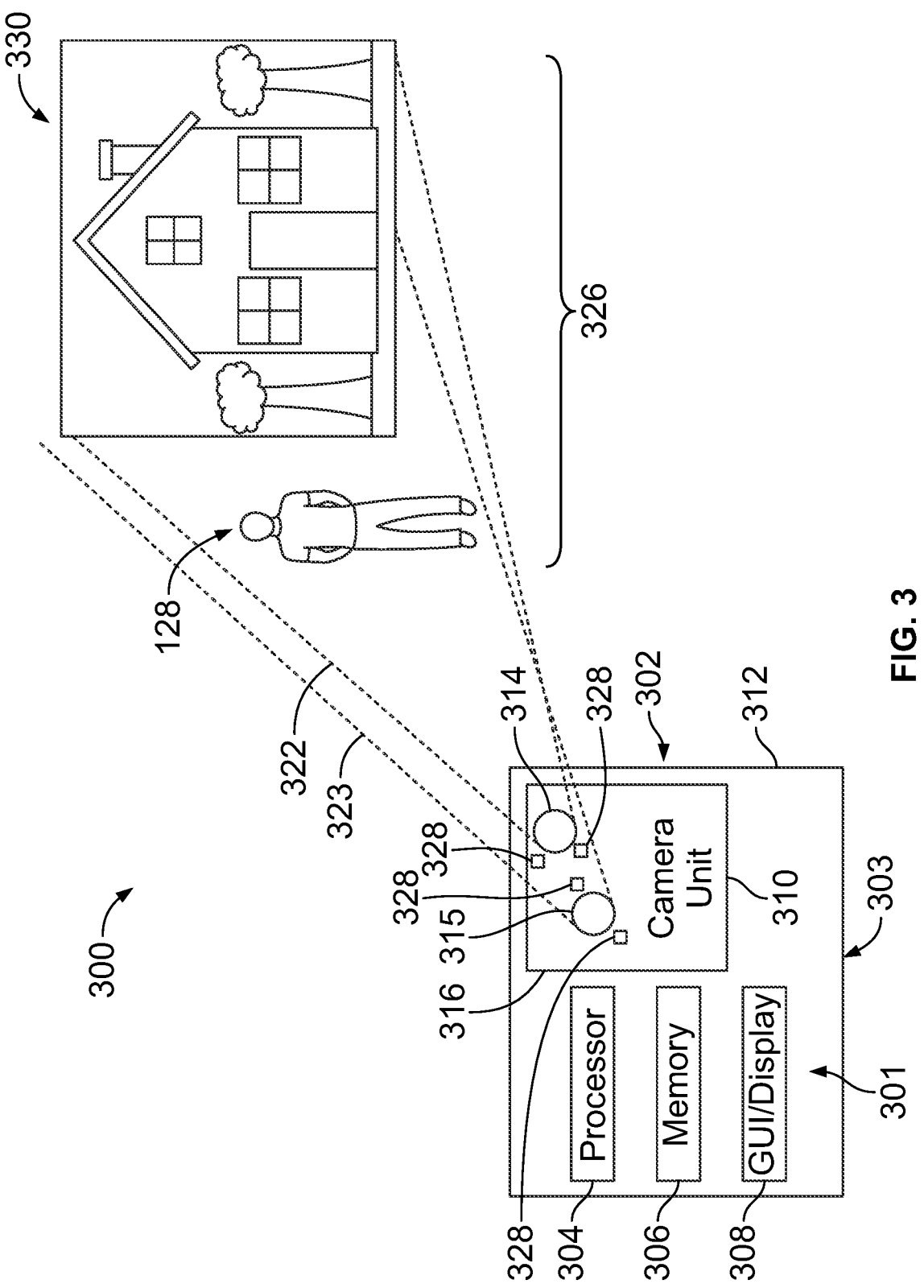
FIG. 3 illustrates a system for implementing a camera behind a display of a device in accordance with embodiments herein.

FIG. 3 illustrates a system 300 implementing a camera behind a display of an electronic device 302 in accordance with embodiments herein. The system 300 includes an electronic device 302 that may be stationary or portable/handheld. The electronic device 302 includes, among other things, a processor 304, local storage medium 306, and a graphical user interface (including a display) 308. The electronic device 302 also includes a CUD 310. In one example, the CUD 310 is a digital camera unit.

The electronic device 302 includes a housing 312 that holds the processor 304, local storage medium 306, user interface 308, display stack 316, and CUD 310. The housing 312 includes a display surface 301 and a back surface 303. A display stack 316 is positioned within in the housing 312 proximate to the display surface 301. In one embodiment, the display stack 316 includes an upper surface that has plural camera display pixels, and a bottom cathode layer that powers the camera display pixels. The CUD 310 also includes one or more camera sensors 314, 315. The CUD 310 is oriented within the housing so camera sensors 314, 315 of the CUD 310 face the display surface 301. The display stack 316 lies between the display surface 301 and the camera sensors 314, 315 of the CUD 310.

Each camera sensor 314, 315 has a respective field of view 322, 323, and thus degrees of light capture. The CUD 310 operates under control of the processor 304 in order to capture image data for a scene 326 in the field of view 322, 323 of the corresponding camera sensors 314, 315. In one example, a user 128 of the electronic device may be within the field of view. Alternatively, the user plus a scene 326 may be captured. The camera sensors 314, 315 include camera sensor pixels to capture image data for the scene 326 in the field of view 322 of camera sensors 314, 315 of the CUD. The camera sensor pixels are arranged into a sensor matrix having a sensor resolution.

In one example, the camera sensors 314, 315 can be identical to each other but spatially offset from each other to produce different views of the scene 326. In another example, the camera sensor 314 may determine the point of view of the CUD 310 and the camera sensor 315, having a lower resolution, may measure image data, such as color data, depth data, infrared data, and the like, for the scene. Additionally or alternatively, the camera sensor 315 can be located over the display stack 316 and camera sensor 314 under the display stack 316.

Selected display pixels 328 are disposed within a CUD region as described in more detail above. In particular, the selected display pixels 328 are in the CUD region 310. The CUD region includes all portions of the electronic device 302 that are vertical from the CUD 310. In this manner, the portions of the display stack located above the CUD region 310 are considered the CUD region of the display.

The selected display pixels 328 can be selected based on the location in the CUD region 310. In one example the selected display pixels 328 are aligned, while in another example the selected pixels 328 are adjacent to one another. In yet another example, the selected display pixels 328 are staggered, or not adjacent to one another. In an example, the selected display pixels 328 encompass an area of the CUD region 310 such that the selected display pixels 328 are configured to block or prevent a camera sensor from detecting the eyes, nose, or mouth of a user. In one example, the selected display pixels vary based on the movement and location of the CUD region 310 to a face of a user. One or more processors may continuously determine based on the location, angle, position, etc. of the CUD to a user the display pixels that align with a face of a user and select the selected display pixels based on the location, angle, position, etc. In this manner, the display pixels adjacent the camera pixels that are to capture the eyes, nose, mouth, or the like are then determined to be the selected display pixels. By obstructing the field of view of the camera pixels/sensors from clearly detecting the eyes, nose, mouth, etc. of a user, biometric algorithms are prevented from extracting user facial features to stop identification of the user by a third party.

Figure 4:
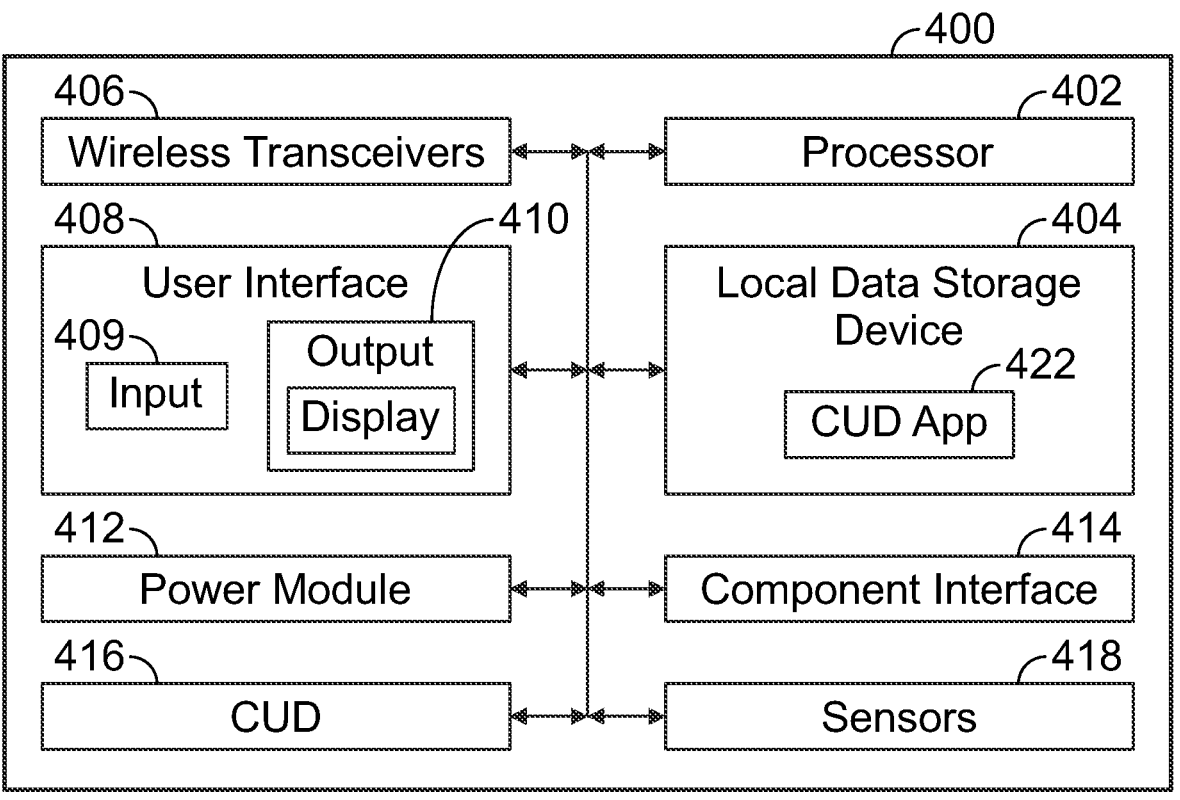
FIG. 4 illustrates a control system for an electronic device with a CUD, in accordance with embodiments herein.

Turning now to FIG. 4, FIG. 4 illustrates a control system 400 of an electronic device. In one example the electronic device is the electronic device of any of FIGS. 1-3.

The control system 400 includes components such as one or more processors 402 (e.g., a microprocessor, microcomputer, application-specific integrated circuit, etc.), one or more local storage medium (also referred to as a memory portion) 404, one or more wireless transceivers 406, a user interface 408 which includes one or more input devices 409 and one or more output devices 410, a power module 412, a component interface 414, and a CUD 416. All of these components can be operatively coupled to one another, and can be in communication with one another, by way of one or more internal communication links, such as an internal bus.

The local storage medium 404 can encompass one or more memory devices of any of a variety of forms (e.g., read only memory, random access memory, static random access memory, dynamic random access memory, etc.) and can be used by the processor 402 to store and retrieve data. The data that is stored by the local storage medium 404 can include, but not be limited to, operating systems, applications, obtained user characteristics, obtained electronic device characteristics, etc. Each operating system includes executable code that controls basic functions of the device, such as interaction among the various components, communication with external devices via the wireless transceivers 406 and/or the component interface 414, and storage and retrieval of applications and context data to and from the local storage medium 406.

The input and output devices 409, 410 may each include a variety of visual, audio, and/or mechanical devices. For example, the input devices 409 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. The output devices 410 can include a visual output device such as a liquid crystal display screen, one or more light emitting diode indicators, a mechanical output device such as a vibrating mechanism, etc. The display may include a display stack and be touch sensitive to various types of touch and gestures. As further examples, the output device(s) 410 may include a touch sensitive screen, a non-touch sensitive screen, a text-only display, a smart phone display, and/or any combination thereof.

The user interface 408 permits the user to select one or more of a switch, button, or icon to collect user characteristics, and/or electronic device characteristics. The user interface 408 can also direct the one or more sensors 418 to obtain user characteristics. As an example, the sensor can be a microphone, motion sensor, global positioning sensor, or the like.

The local storage medium 406 in one embodiment stores various content including, but not limited to a CUD application 422. The CUD application 422 includes executable code that utilizes an operating system to provide a user an option of actuating selected display pixels of a display stack to prevent programs, application, etc. from utilizing biometric algorithms that can identify the user. The CUD application 422 may be accessed by a user on the display stack such that the user can determine whether to actuate the selected display pixels. The CUD application 422 may be part of a menu or program of an operating system, provided by a software update, provided as a stand-only application that may be downloaded or uploaded, or the like.

In one example, the user may input user profile information related to the specific user. In this manner, when the user logs into the electronic device as a result of a password, passcode, pass pattern, finger print, facial recognition, eye recognition, or the like, the setting from the profile is automatically provided. For one individual who desires targeted advertisements, or in not bothered by being identified may have the setting where the selected display pixels are not actuated. For another individual who does not desire targeted advertisements, does not like being identified, etc., the setting may be on such that as soon as the access to the electronic device is gained, selected display pixels are determined and actuated. In another example, an individual may manually change the setting so that the selected display pixels are either turned on or off based on the selection. In one example, when the CUD application 422 is initially installed, the setting is automatically in an "on" setting. Alternatively, the setting is automatically in an "off" setting and the application prompts the user regarding whether identification blocking is desired. In another example, a prompt may appear each time an electronic device is unlocked. To this end, the processor can be configured to vary the selected display pixels by turning "on" and turning "off" selected display pixels whereby the number of selected display pixels turned "on" and "off" prevent a biometric algorithm from extracting user facial feature.

Figure 5:
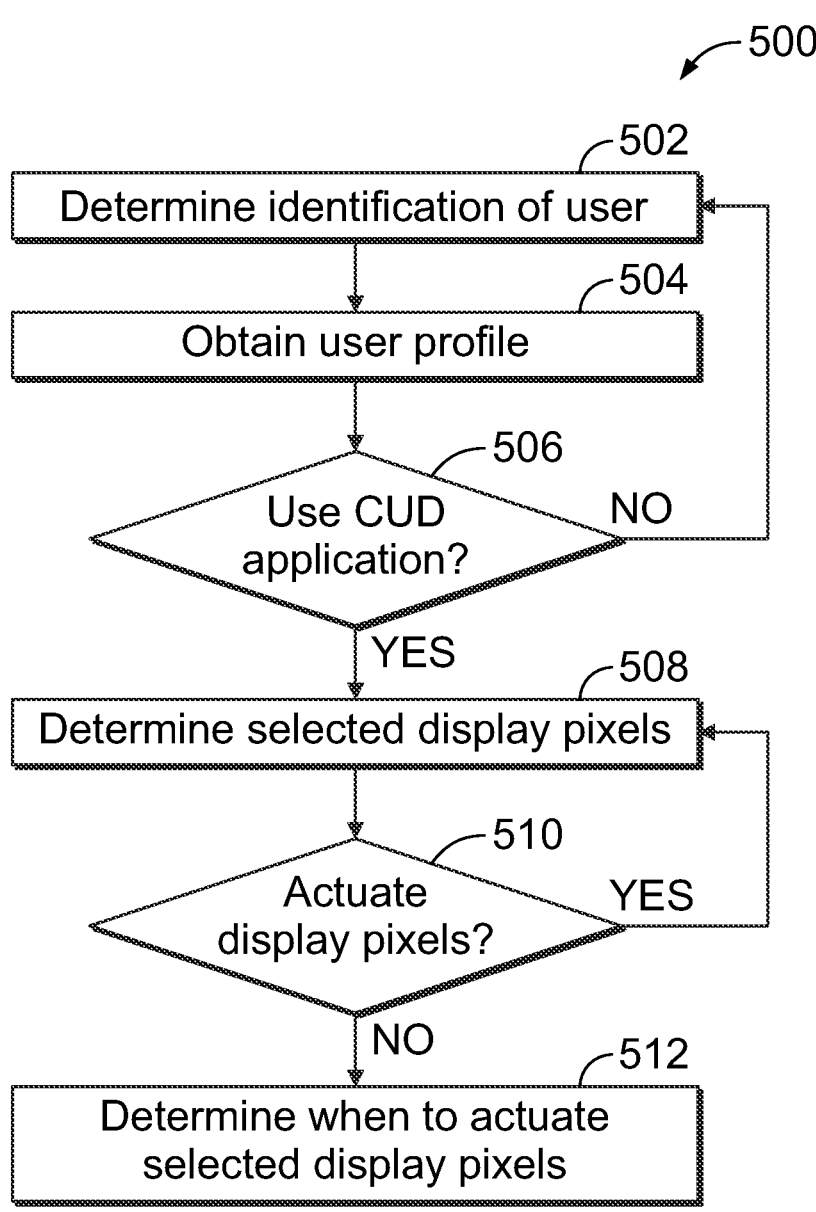
FIG. 5 illustrates a block flow diagram illustrating a method for preventing user identification by a third party via a CUD, in accordance with embodiments herein.

FIG. 5 illustrates a flow block diagram of a method 500 of preventing identification of a user of an electronic device by a third party program or application. In one example, the electronic device and control system illustrated in FIGS. 1-4 are utilized to implement the method.

At 502, one or more processors determine an identification of a user of an electronic device. The determination may be made based on a password, passcode, login, fingerprint scan, facial scan, or the like. In some embodiments, the user of an electronic device may vary. For example, a laptop may be utilized by plural members of a family. For example, when the laptop is initially operated, a password, passcode, login, fingerprint scan, facial scan, or the like must be provided to allow access to the laptop. Based on this information, the user of the laptop may be identified accordingly.

At 504, the one or more processors obtain a user profile and corresponding setting for a CUD application based on the user identified as operating the electronic device. The user profile can include information related to a particular user, including security preferences. In one example, the CUD application may have default settings that may be edited by a user. In another example, the CUD application may prompt a user to provide settings. In yet another example, the CUD application can detect when a third party application is attempting to utilize the CUD to obtain information related to the user, and in response to detecting the attempt, a prompt may be provided that a third party application is attempting to obtain user information and a request to increase security, or alter security settings.

In an example, the setting can include a security setting such that at all times the CUD application actuates selected display pixels to blur or obstruct a field of view to prevent the identity of the user by bio scanning by a third party application via the CUD. In another example, the user may provide a list of applications or programs that may obtain user information by bio scanning by a third party application, or a list of applications or programs where the CUD application does not run during use. In one example, when a meeting application such as GoToMeeting, WebEx, or the like is operating the CUD application may be operating to not actuate and cause the blurring and obscuring of the field of view that includes the user. Alternatively, certain users may desire certain applications such as Amazon, or another shopping website to provide purchasing suggestions, so when such third party applications desire user information, the CUD application can again allow such information to be collected. To this end, the user may provide a customized list of webpages, websites, programs, applications, or the like that may utilize the CUD to obtain user information. Then for any webpage, website, program, application, etc. not on that list, the CUD application operates to blur, block, etc. the field of view, or portions of the field of view.

At 506, the one or more processors determine if the user desires to utilize the CUD application to prevent websites, programs, applications, etc. from obtaining user information using the CUD. Based on the user settings, if the user is ok with third party applications obtaining information, no action is taken by the CUD application.

If a determination is made that the user desires to utilize the CUD application, then at 508 the one or more processors continuously determine, select, and acuate selected display pixels. The selected display pixels may be continuously determined based on the position, location, tilt, etc. of a display stack in comparison to the face of a user. In this manner, as the display moves in relation to the user, the selected display pixels vary. In particular, the selected display pixels are selected based on the location of a user's eyes, nose, mouth, and/or other facial features utilized to identify the user of the electronic device. In addition the coloring, brightness, intensity, and other lighting characteristics may also be varied during actuation to further blur, block, obfuscate, or the like portions of the field of view to prevent identification of the user. By actuating the selected display pixels, including the use of different colors, intensities, etc., the resulting image data obtained from the CUD is blurred, blocked, obfuscated, etc. for the portion of the field of view that includes eyes, nose, mouth and/or other facial features. As a result, application, programs, or the like that utilize biometric algorithms are unable to extract user facial features to identify the user of the electronic device.

At 510, the one or more processors determine whether to stop actuating the selected display pixels in response to launching a program, application, or the like. In one example, the CUD application includes a lookup table that includes all programs, applications, etc. that are permitted to obtain CUD data. In one example, a web conferencing application is launched, and in response to the launching, a determination is made that the web conference application is allowed to obtain the CUD data. Thus, at 512 the one or more processors stop actuating the selected display pixels. Consequently, the CUD obtains a clear image of the user for the web conference. Alternatively, if the program launched is a webpage, application, program, etc. not on the list, the CUD application continues actuating the selected display pixels.

At 514, once the program, application, etc. is done operating the one or more processors again actuate the selected display pixels to blur, block, obfuscate, or the like any image data that may be obtained by the CUD. So, enhanced secured it provided.

Conclusion

Before concluding, it is to be understood that although e.g. a software application for undertaking embodiments herein may be vended with a device such as the system 100, embodiments herein apply in instances where such an application is e.g. downloaded from a server to a device over a network such as the Internet. Furthermore, embodiments herein apply in instances where e.g. such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A electronic device, comprising:
a display stack having display pixels;
at least one camera sensor located proximate to the display stack,
a processor; and
a memory storing program instructions accessible by the processor, wherein, responsive to execution of the program instructions, the processor configured to:
determine selected display pixels of the display pixels based on a location of the display stack of the electronic device to a user of the electronic device; and
actuate the selected display pixels by varying a characteristic of the selected display pixels to selectively blur a portion of an image in a field of view of the at least one camera sensor based on the location of the display stack to the user;
wherein varying the characteristic of the selected display pixels includes varying color and light intensity of the selected display pixels;
wherein the processor is configured to vary the selected display pixels by turning on and turning off selected display pixels; wherein the number of selected display pixels turned on and off prevent a biometric algorithm from extracting user facial feature.

2. The electronic device of claim 1, wherein the processor is configured to vary the selected display pixels based on continuously determining a position of the display stack in relation to a face of a user.

3. The electronic device of claim 1, wherein the processor is configured to vary the selected display pixels by turning on and turning off selected display pixels; wherein the number of selected display pixels turned on and off prevent a biometric algorithm from extracting user facial feature.

4. The electronic device of claim 1, the processor is configured to determine a launching of an application on the electronic device; determine whether the application allows use of the at least one camera sensor; and stop actuating the selected display pixels in response to determining the application allows use of the at least one camera.

5. The electronic device of claim 4, wherein the application is a web conferencing application.

6. The electronic device of claim 4 wherein the processor is configured to determine the application has ended, and actuate the selected display pixels to selectively blur a portion of an image in a field of view of the at least one camera sensor in response to determining the application has ended.

7. The electronic device of claim 1, wherein to determine the selected display pixels includes determining a location of at least one of an eye, nose, or mouth of a user and selecting the selected display pixels based on the location of the at least one of the eye, nose, or mouth of the user.

8. The electronic device of claim 1, wherein the electronic device is a smartphone and the at least one camera sensor is part of a camera under display of the smartphone.

9. A electronic device, comprising:
a display stack having display pixels;
at least one camera sensor located proximate to the display stack,
a processor; and
a memory storing program instructions accessible by the processor, wherein, responsive to execution of the program instructions, the processor configured to:
determine an identification of a user of the electronic device;
determine selected display pixels of the display pixels based on a location of the display stack of the electronic device to the user;
vary the selected display pixels based on a position of the display stack to a face of the user as the user moves in relation to the electronic device;
actuate the selected display pixels by varying a characteristic of the selected display pixels after varying the selected display pixels based on the position of the display stack to the face of the user as the user moves in relation to the electronic device to selectively blur a portion of an image in a field of view of the at least one camera sensor in response to determining the selected display pixels to prevent a biometric algorithm from extracting user facial features;
determine a launching of an application on the electronic device;
determine whether the application allows use of the at least one camera sensor; and
stop actuating the selected display pixels in response to determining the application allows use of the at least on camera.

10. The electronic device of claim 9, wherein the characteristic of the selected display pixels includes color and light intensity.

11. A electronic device, comprising:
a display stack having display pixels;
at least one camera sensor located proximate to the display stack,
a processor; and
a memory storing program instructions accessible by the processor, wherein, responsive to execution of the program instructions, the processor configured to:
determine selected display pixels of the display pixels based on a location of the display stack of the electronic device to a user of the electronic device; and
actuate the selected display pixels by varying a characteristic of the selected display pixels to selectively blur a portion of an image in a field of view of the at least one camera sensor to prevent a biometric algorithm from extracting user facial features based on the location of the display stack to the user;
wherein the processor is configured to vary the selected display pixels by turning on and turning off selected display pixels; wherein the number of selected display pixels turned on and off prevent a biometric algorithm from extracting user facial feature.

12. The electronic device of claim 11, wherein varying the characteristic of the selected display pixels includes varying color and light intensity of the selected display pixels.

13. The electronic device of claim 11, wherein the processor is configured to vary the selected display pixels based on continuously determining a position of the display stack in relation to a face of a user.

14. The electronic device of claim 11, the processor is configured to determine a launching of an application on the electronic device; determine whether the application allows use of the at least one camera sensor; and stop actuating the selected display pixels in response to determining the application allows use of the at least on camera.

15. The electronic device of claim 14, wherein the application is a web conferencing application.

16. The electronic device of claim 15 wherein the processor is configured to determine the application has ended, and actuate the selected display pixels to selectively blur a portion of an image in a field of view of the at least one camera sensor in response to determining the application has ended.

17. The electronic device of claim 11, wherein to determine the selected display pixels includes determining a location of at least one of an eye, nose, or mouth of a user and selecting the selected display pixels based on the location of the at least one of the eye, nose, or mouth of the user.

* * * * *